United States Patent Office 3,519,385
Patented July 7, 1970

3,519,385
METHOD FOR SEPARATING MOLYBDENUM FROM TECHNETIUM
Elmer C. Hurst, Powell, and Homer B. Hupf, Oak Ridge, Tenn., assignors to the United States of America as represented by the United States Atomic Energy Commission
No Drawing. Filed Mar. 12, 1968, Ser. No. 712,377
Int. Cl. C22b 59/00
U.S. Cl. 23—22                                                      2 Claims

ABSTRACT OF THE DISCLOSURE

A method for separating molybdenum from technetium from a solid mixture thereof which comprises contacting said mixture with an aqueous solution of hydrogen peroxide at a sufficient peroxide concentration and for a sufficient time to dissolve the molybdenum and technetium, reducing the volume of the resultant solution until at least a portion of the molybdenum precipitates and then separating the aqueous phase from the precipitated phase.

BACKGROUND OF THE INVENTION

The invention described herein was made in the course of, or under, a contract with the U.S. Atomic Energy Commission.

The present invention relates to, and has for its principal object to provide, a method for the dissolution of molybdenum and technetium and the radiochemical separation of these elements.

The $^{99m}$Tc isotope has developed significant use as a medical diagnostic tool. For such use, the technetium isomer must available in radiochemically pure form in a solution of high specific technetium activity. In order to provide $^{99m}$Tc for such application, the manufacture must have available a rapid, economical, and hazard-free process for providing it as a useful product to the user. In order to satisfy these criteria, the manufacturer is faced with two major problems.

Target sites at nuclear reactors and other suitable neutron or proton sources are limited in size and geometry. Because of this, it is most desirable to present a target having maximum molybdenum density to the neutron or proton source. In actual practice, however, a molybdenum oxide has been used because available and known dissolution reagents for molybdenum metal are unsatisfactory. For example, while nitric acid will dissolve molybdenum, it has a distinct tendency to passivate the surface of the metal and thus prevent a clean and complete dissolution. Where high nitric acid concentrations are used the reaction can be violent. Solutions of aqua regia are not desirable for the same reason. A nitrate solution, in any event, is undesirable in medical products. An aqueous solution of ammonium hydroxide will dissolve molybdenum metal only with great difficulty.

A second problem faced by a manufacturer of $^{99m}$Tc relates to the nature and quality of the product required by the user. In its most desirable form, the $^{99m}$Tc product is presented to the user after separation from $^{99}$Mo parent by the manufacturer. This is often accomplished by adding a mixture of molybdenum, technetium, and other ions to a chromatographic alumina or zirconia column of fixed size and geometry and selectively eluting the technetium. Such columns are usually no more than about 10 mm. in diameter and 150 mm. high. In order to "milk" the column, a pharmaceutically acceptable solution such as an aqueous solution of sodium chloride is passed through the column to selectively elute technetium. The difficulty that presents itself here is that the column frequently experiences breakthrough in which molybdenum and other impurities co-elute with the technetium, thus contaminating the technetium-containing eluate and rendering it useless in many cases.

SUMMARY OF THE INVENTION

The present invention overcomes these difficulties to a large extent by providing a reagent which not only dissolves molybdenum and technetium in a safe and reliable manner but also allows rapid separation of molybdenum from technetium to form a final solution with an increased $^{99m}$Tc/Mo mole ratio. The invention and its attendant advantages are based on the discovery that aqueous solutions of hydrogen peroxide can dissolve molybdenum metal to produce a clear, yellow, stable solution in which the technetium is completely soluble and the molybdenum is soluble to the extent of from 15–20 grams per liter.

The useful concentration of unstabilized hydrogen peroxide in solution as a dissolution medium is from 15–30 weight percent. While lower concentrations of peroxide will dissolve the molybdenum, the time of dissolution will be extended unduly and provides no practical advantage. Higher concentrations of $H_2O_2$ will also work but introduce an element of potential hazard. In the range 15–30 weight percent of hydrogen peroxide, the molybdenum will dissolve at room temperature in a smooth and continuous manner to form a clear, yellow, stable solution thought to consist of $H_2MoO_4 \cdot H_2O$. The solution is quite stable. Observation of the resultant clear, yellow solution over aperiod of in excess of two weeks at room temperature (about 25° C.) did not reveal the formation of any clouding of the solution or precipitate formation. The resultant solution is acidic having a pH of about 1.

In order to separate molybdenum from technetium, the clear, yellow, stable solution previously referred to is evaporated to a fraction of its original volume. The technetium remains in solution while most of the molybdenum precipitates. Filtration of this solution will effect substantial separation of the molybdenum from technetium to produce a filtrate having an increased $^{99m}$Tc/Mo mole ratio. The filtrate can be charged onto a chromatographic column of alumina or zirconia by adjusting the pH to a value in the range 2 to 5 with sodium hydroxide or ammonium hydroxide. Purification by solvent extraction can be effected by converting the filtrate to an ammoniacal solution and then extracting with pyridine or methyl-substituted pyridines in accordance with well known solvent extraction techniques, see, for example, "Analytical Chemistry," volume 33, page 751, May 1961.

The following example illustrates a typical procedure for utilizing the peroxide reagent of this invention to produce a radio-chemically pure technetium product.

EXAMPLE

A molybdenum metal target was exposed to the neutron beam of a nuclear reactor until a desired quantity of $^{99}$Mo (T½ = 67 hours) was produced by the $^{98}$Mo (n, α) $^{99}$Mo reaction. Technetium-$^{99}$m is formed in equilibrium with $^{99}$Mo by radioactive decay. The irradiated molybdenum target was dissolved in 150 ml. of 15 (weight percent) $H_2O_2$ solution. The resultant clear, yellow-colored solution was then evaporated to a fraction of its original volume to produce a molybdenum-containing precipitate. The resulting solution was filtered to produce a filtrate containing the bulk of the technetium. This filtrate can now be used, after suitable adjustment to the proper pH by addition of $NH_4OH$, as the charging solution for an alumina or zirconia chromatographic column. Chromatographic columns suitable for this purpose are described in "International Journal of Applied Radiation and Isotopes,"

1966, volume 17, pages 664–666, and references cited therein.

The advantages of practicing this invention as illustrated by the example are apparent when it is realized that the peroxide reagent functions not only to dissolve the technetium but also allows selective precipitation of molybdenum by a simple operation, Use of the peroxide reagent produces a solution with an increased $^{99m}$Tc/Mo mole ratio simply and efficiently within a short time and allows this solution to be rapidly charged, after suitable pH adjustment, to the chromatographic column. Thus, the peroxide reagent reduces the processing time to a minimum. Since the reagent allows production of a solution having an increased $^{99m}$Tc/Mo mole ratio, the chances of molybdenum breakthrough from the chromatographic column are reduced to a minimum.

While we have described the use of aqueous peroxide solution in terms of its advantages for rapidly separating $^{99m}$Tc from molybdenum for a particular application, it will be apparent that aqueous peroxide solutions can be used with advantage wherever dissolution or separation of molybdenum from technetium is desired.

What is claimed is:
1. A method for separating molybdenum from technetium from a solid mixture thereof which comprises contacting said mixture with an aqueous solution of hydrogen peroxide at a sufficient peroxide concentration and for a sufficient time to dissolve the molybdenum and technetium, reducing the volume of the resultant solution until at least a portion of the molydenum precipitates and then separating the aqueous phase from the precipitated phase.

2. The method according to claim 1 wherein the effective concentration of peroxide is 15–30 weight percent.

References Cited

UNITED STATES PATENTS 3,005,683   10/1961   Rimshaw _____ 23—24
3,436,354   4/1969    Gemmill et al. _____ 23—18 X

OTHER REFERENCES

Perrier et al., "Journal of Chemical Physics," vol. 7, March 1939, pp. 155–156.

HERBERT T. CARTER, Primary Examiner

U.S. Cl. X.R.

23—140